Figure 1:
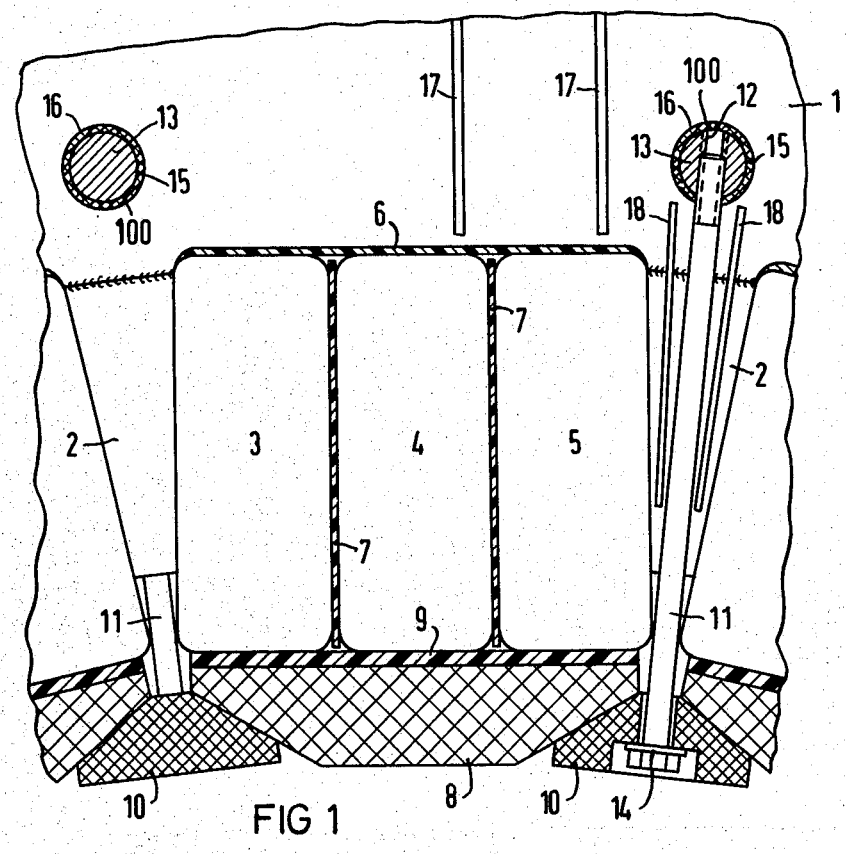

United States Patent [19]

Böer et al.

[11] 4,356,419
[45] Oct. 26, 1982

[54] APPARATUS FOR FASTENING AN AIR GAP WINDING

[75] Inventors: Joachim Böer; Heinrich Beermann, both of Mulheim an der Ruhr, Fed. Rep. of Germany

[73] Assignee: Kraftwerk Union Aktiengesellschaft, Mulheim on der Ruhr, Fed. Rep. of Germany

[21] Appl. No.: 159,308

[22] Filed: Jun. 13, 1980

[30] Foreign Application Priority Data

Jun. 20, 1979 [DE] Fed. Rep. of Germany ....... 2924863

[51] Int. Cl.³ .............................................. H02K 1/06
[52] U.S. Cl. .................................... 310/217; 310/42; 310/214; 310/218; 310/259; 29/596
[58] Field of Search ................. 310/216, 217, 218, 42, 310/45, 214, 215, 254, 257, 258; 29/598, 596; 336/210

[56] References Cited

U.S. PATENT DOCUMENTS

| | | | |
|---|---|---|---|
| 694,999 | 3/1902 | Schneider | 310/214 |
| 2,473,302 | 6/1949 | Ringland | 310/254 |
| 2,607,816 | 8/1952 | Ryder | 310/42 |
| 4,228,375 | 10/1980 | Beermann | 310/179 |

FOREIGN PATENT DOCUMENTS

| | | | |
|---|---|---|---|
| 672647 | 11/1965 | Belgium | 310/216 |
| 2627802 | 12/1977 | Fed. Rep. of Germany | 310/218 |
| 1530210 | 10/1978 | United Kingdom | 310/214 |

*Primary Examiner*—R. Skudy
*Attorney, Agent, or Firm*—Herbert L. Lerner; Laurence A. Greenberg

[57] ABSTRACT

Apparatus for fastening an air gap winding for electric machines having a large power rating, such as turbo generators, including a stator lamination stack formed of magnetic lamination segments, a mounting body formed of non-magnetic lamination segments having teeth with slots formed therebetween, the mounting body being welded at a seam to the stator lamination stack to form common lamination segments, winding bars being held in the slots and extending beyond the teeth into the mechanical air gap, pressure strips disposed in longitudinal direction of the slots pretensioning the winding bars in radial direction, clamping screws being radially disposed in the vicinity of the slot teeth and holding the pressure strips, and abutments anchoring the clamping screws in the vicinity of the stator lamination stack.

7 Claims, 2 Drawing Figures

APPARATUS FOR FASTENING AN AIR GAP WINDING

The invention relates to an apparatus for fastening an air gap winding for electric machines of large power rating, especially turbo generators, with a mounting body which is constructed from magnetic lamination segments and is connected to the stator lamination stack, and with winding bars held in slots of the mounting body which extend beyond the slot teeth into the mechanical air gap and are braced in the radial direction with pretension by pressure strips extending in the longitudinal direction of the slots, the pressure strips being held by clamping screws which are radially disposed in the region of the slot teeth and are anchored in abutments.

Such an arrangement is known from German Published Non-Prosecuted Application DE-OS No. 25 50 386, which corresponds to British Pat. No. 1,530,210. The forces attacking the winding bars in the tangential direction are taken up in that device by the slot teeth of the mounting body. The forces acting in the radial direction on the winding bars act with twice the line frequency on the bottom of the slot, whereby the bar assembly and the insulation are subjected to a continuous swelling pressure stress. In order to ensure that this stress cannot have a destructive effect, in the known construction the winding bars are held in the slots by a sufficiently large pretension. This pretension, which is to prevent vibration of the winding bars in the slots, is brought about by pressure strips extending in the longitudinal direction of the slots and by interposed spring elements; the pressure strips being held by radial clamping screws. The radial clamping screws in turn are anchored in abutments which are disposed in the vicinity of the slot teeth. Through the spring travel of the pretensioned spring elements, play of the winding bars in the slot due to setting of the slot filling and impeded thermal expansion can be compensated.

A further problem which arises in addition to the tangential and radial fastening of the winding bars in such construction is the fastening of the mounting body in the stator lamination stack of the electric machine. This fastening must in particular be suitable for transmitting the torque, which acts in the air gap, onto the stator lamination stack. From German Published Non-Prosecuted Application DE-OS No. 26 27 802, a fastening construction is known in which the mounting body has dove-tail extensions at the outer circumference which are pushed into correspondingly-shaped slots of the stator lamination stack; within the dove-tail joint, an additional bracing acting in the radial direction is provided. Therefore, a form-fitting or self-locking and frictional connection between the mounting body and the stator lamination stack is obtained.

However, the prior art devices have been found to be too complex and to be deficient from a safety point of view concerning the forces developed.

It is accordingly an object of the invention to provide an apparatus for fastening an air gap winding which overcomes the hereinafore-mentioned disadvantages of the heretofore-known devices of this general type, and which can, on on the one hand, be constructed very simply, and on the other hand, assures great operational safety for introducing the force into the stator lamination stack, in view of controlling the tangential and radial forces acting on the winding bars.

With the foregoing and other objects in view there is provided, in accordance with the invention, an apparatus for fastening an air gap winding for electric machines having a large power rating, such as turbo generators, comprising a stator lamination stack formed of magnetic lamination segments, a mounting body formed of non-magnetic lamination segments having teeth with slots formed therebetween, the mounting body being welded at a seam to the stator lamination stack to form common lamination segments, winding bars being held in the slots and extending beyond the teeth into the mechanical air gap, pressure strips disposed in longitudinal direction of the slots pretensioning the winding bars in radial direction, clamping screws being radially disposed in the vicinity of the slot teeth and holding the pressure strips, and abutments anchoring the clamping screws in the vicinity of the stator lamination stack. Through this construction, the stator lamination stack and the mounting body are combined to form a single component, which meets all requirements regarding controlling the tangentially attacking forces and ensures a short-circuit proof connection of the air gap winding to the shielding package. The lamination segments fabricated by welding from different segment parts have approximately the same mechanical strength as a homogeneous lamination segment and are divided, due to the magnetic properties, into a magnetic shielding zone and a non-magnetic holding zone. In addition to the direct introduction of the forces attacking the winding bars tangentially into the stator lamination stack, however, the forces which attack the winding bars radially are also introduced through the pressure strips and the radial clamping screws directly into the stator lamination stack since the abutments of the radial clamping screws are disposed in the region of the stator lamination stack. Because the tangential and radial forces are introduced directly into the stator lamination stack, the slot teeth of the mounting body can be relatively small, i.e. the air gap can be covered as far as possible with winding bars.

In accordance with another feature of the invention, the slot teeth have bases in the vicinity of the stator lamination stack, and the welded seam is disposed in vicinity of the bases of the slot teeth.

This keeps the length of the welded seam small on the one hand, and provides a clear separation of functions into the magnetic shielding region and a non-magnetic mounting region on the other hand. However, the welded seam should not run directly along the base line of the slot teeth since the maximum bending moment occurs in this region.

In accordance with a further feature of the invention, the magnetic lamination segments are formed of high-silicon sheets and the non-magnetic lamination segments are formed of austenetic sheets. These two materials can be welded together very well and otherwise meet the requirements of magnetic properties.

In accordance with an added feature of the invention, the abutments are in the form of axially-disposed bolts having transverse tapped holes formed therein for attaching the clamping screws. Such bolts can be inserted in a very simple manner into corresponding axially formed holes of the stator lamination stack.

In accordance with an additional feature of the invention, at least two winding bars are held side by side in each of the slots formed in the mounting body. Through this saving of slot teeth, the remaining slot teeth can be made wider, which has a favorable effect particularly in view of taking up the tangential forces. On the other hand, an almost complete coverage of an air gap with winding bars is obtained by the saving of slot teeth.

In accordance with still another feature of the invention, there is provided insulating biasing material disposed between the winding bars and the pressure strips for supplying the pretensioning to the winding bars.

In accordance with a concomitant feature of the invention, there are provided heads on the clamping screws, holding strips disposed between the heads and the pressure strips, and cup springs disposed between the heads and the holding strips for supplying the pretensioning to the winding bars.

Other features which are considered as characteristic for the invention are set forth in the appended claims.

Although the invention is illustrated and described herein as embodied in an apparatus for fastening an air gap winding, it is nevertheless not intended to be limited to the details shown, since various modifications and structural changes may be made therein without departing from the spirit of the invention and within the scope and range of equivalents of the claims.

Figure 2:
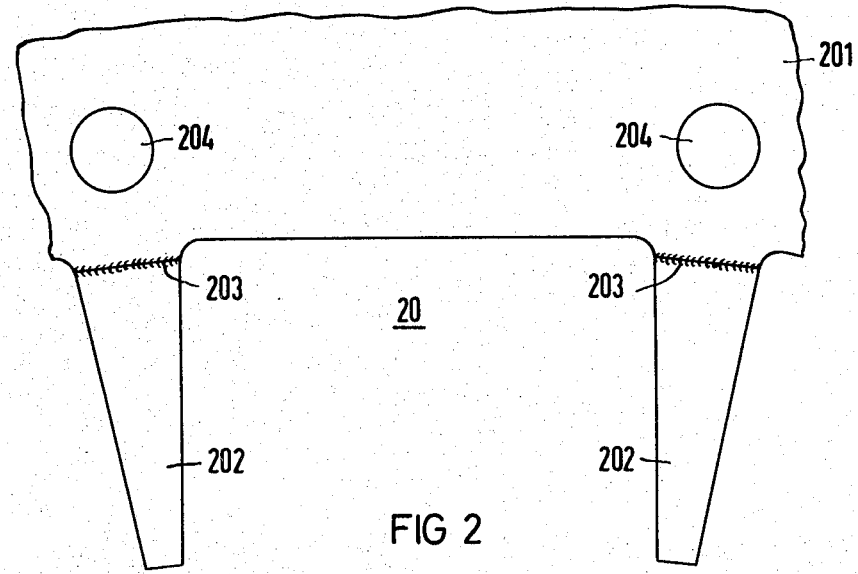

The construction and method of operation of the invention, however, together with additional objects and advantages thereof will be best understood from the following description of specific embodiments when read in connection with the accompanying drawings, in which:

FIG. 1 is a fragmentary diagrammatic cross-sectional view through the stator and the air gap winding of a turbo generator; and FIG. 2 is a fragmentary diagrammatic view of a lamination segment with welded-on slot teeth. Referring now to the figures of the drawing and first particularly to FIG. 1 thereof, it is seen that slot teeth 2 forming a mounting body protrude inwardly from the stator lamination stack 1 of the turbo generator in the radial direction. The adjacent flanks of two slot teeth 2 always define a slot with parallel flanks which serves for accommodating winding bars 3, 4 and 5. Each of these winding bars 3, 4 and 5 comprises a multiplicity of subconductors and an insulating sleeve enclosing the subconductors which, however, is not shown in order to simplify the drawing in FIG. 1. Between the radially outer end faces of the winding bars 3, 4 and 5 and the slot bottom formed by the inner edge of the stator lamination stack 1, an insulating insert 6 of insulating material is disposed. Meanwhile insulating material inserts 7 are inserted into the spaces between the winding bars 3 and 4, and 4 and 5, respectively. To obtain even better tangential tightening, the insulating material inserts 7 may also have the form of corrugated springs.

The forces attacking the winding bars 3, 4 and 5 in the tangential direction are taken up by the flanks of the slot teeth 2 and are conducted through the slot teeth 2 into the stator lamination stack 1.

Pressure strips 8 extending in the direction of the slots are provided for taking up the forces attacking the winding bars 3, 4 and 5 in the radial direction. These pressure strips 8 are pushed against the radially inner end faces of the winding bars 3, 4 and 5. The lateral flanks of the pressure strips 8 are bevelled in such a manner that in the region of each slot 2, V-shaped grooves are formed between two adjacent pressure strips 8. Holding strips 10 having cross sections which match the V-shaped grooves are inserted into the grooves and are held in turn by radial clamping screws 11. The radial clamping screws 11, which are brought through corresponding holes 100 formed in the holding strips 10 are fastened crosswise with respect to the axis of axially-disposed abutments or bolts 13 in the tapped holes 12; the hereinafore-described pretension acting on the winding bars 3, 4 and 5 is supplied by cup springs 14 disposed between the head of the radial clamping screws 11 and the mounting strips 10. As an alternative or addition to these cup springs 14, the pretension can instead be supplied by an insulating material insert 9 made in the form of a corrugated spring. The bolts 13 are jacketed by an insulation 15 and are disposed in corresponding axial holes 16 of the stator lamination stack 1. The radial clamping screws 11 reach the axially-disposed bolts 13 through slots in the slot teeth 2. These slots may be identical with the cooling slots in the stator lamination stack 1 or be made available independently thereof. The width of the slots as seen in the axial direction is determined in the region of the stator lamination stack 1 by webs 17, and in the region of the slot teeth 2, by webs 18.

The stator lamination stack 1 and the slot teeth 2 are constructed from common lamination segments. A portion of such a lamination segment 20 is shown in FIG. 2. It comprises a segment part 201 associated with a stator lamination stack 1 (such as is shown in FIG. 1) and tooth-shaped segment parts 202 which form the slot teeth 2 (of FIG. 1) in the lamination stack. The segment portion 201 without teeth is formed of magnetic material such as high-silicon steel, while the tooth-shaped segment parts 202 are formed of non-magnetic material, for instance of an austenetic sheet, such as X10CrNiTi189. The segment part 201 without teeth is joined to the tooth-shaped segment parts 202 by welded seams 203 which run in the region of the base lines of the teeth. The welded seams 203 are disposed somewhat offset from the base line of the teeth since the maximum bending moment occurs in the base line.

For fabricating the lamination segments 20, the segment parts 201 and 202 are first welded together. Thereupon, a compound die of the entire lamination segment 20 is provided in order to obtain high dimensional accuracy of the slot spaces and to remove the unavoidable end craters of the welded seams 203. In the compound die cut, holes 204 which are simultaneously punched correspond to the holes 16 for receiving the axially-disposed bolts 13 as shown in FIG. 1. The welded seams 203 can be made, for instance, by electron beam welding or by tungsten inert gas welding (TIG) with continuous or pulsating current. In strength tests performed after the welding, it was found that the welded lamination segment 20 behaves as if it were made of a homogeneous sheet. With respect to warping during the welding, electron beam welding is given preference over other welding methods due to the smaller region occupied by the welded seam.

There are claimed:

1. Apparatus for fastening an air gap winding for electric machines having a large power rating, such as turbo generators, comprising a stator lamination stack formed of magnetic lamination segments, a mounting body formed of non-magnetic lamination segments having teeth with slots formed therebetween, said non-magnetic mounting body being integral with said magnetic stator lamination stack forming common homogeneous lamination segments by welding said teeth in the regions of the base lines thereof to said stator lamination stack segments in the circumferential direction, winding bars being held in said slots and extending beyond said teeth into the mechanical air gap, pressure strips disposed in longitudinal direction of said slots pretensioning said winding bars in radial direction, clamping screws being radially disposed in the vicinity of said slot teeth and holding said pressure strips, and abutments anchoring said clamping screws in the vicinity of said stator lamination stack.

2. Apparatus according to claim 1, wherein said slot teeth have bases in the vicinity of said stator lamination stack, and said welded seam is disposed in vicinity of said bases of said slot teeth.

3. Apparatus according to claim 1 or 2, wherein said magnetic lamination segments are formed of high-silicon sheets and said non-magnetic lamination segments are formed of austenetic sheets.

4. Apparatus according to claim 1, wherein said abutments are in the form of axially-disposed bolts having transverse tapped holes formed therein for attaching said clamping screws.

5. Apparatus according to claim 1, wherein at least two winding bars are held side by side in each of said slots formed in said mounting body.

6. Apparatus according to claim 1, including insulating biasing material disposed between said winding bars and said pressure strips for supplying said pretensioning to said winding bars.

7. Apparatus according to claim 1, including heads on said clamping screws, holding strips disposed between said heads and said pressure strips, and cup springs disposed between said heads and said holding strips for supplying said pretensioning to said winding bars.

* * * * *